April 5, 1960

C. F. ROCKEY 2,931,966

ALTERNATING CURRENT RECTIFIER

Filed Jan. 14, 1955

Inventor
Charles F. Rockey
Marshall A. Burmeister
Attorney

April 5, 1960  C. F. ROCKEY  2,931,966
ALTERNATING CURRENT RECTIFIER
Filed Jan. 14, 1955  2 Sheets-Sheet 2

Inventor
Charles F. Rockey
By:
Marshall A. Burmeister
Attorney

United States Patent Office 2,931,966
Patented Apr. 5, 1960

2,931,966
ALTERNATING CURRENT RECTIFIER
Charles F. Rockey, Milwaukee, Wis.
Application January 14, 1955, Serial No. 481,904
13 Claims. (Cl. 321—8)

The present invention relates generally to alternating current rectifiers, and more specifically to a device combining a ferromagnetic core coil system and a semi-conducting rectifier.

Electrical power is conventionally delivered to the ultimate consumer in the form of alternating current, usually at an effective voltage between 110 and 120 volts. Power delivered in this form is suitable for directly energizing electrical heating elements and driving electro-mechanical devices, but is not suitable for many other applications where direct current is required. For such applications requiring direct current, it is necessary to rectify the alternating current supplied from the power lines.

For many applications, such as radio, television and other electronic devices, merely rectifying the power supplied from a power line does not produce an adequate source of D.C. potential. This is generally due to one of two factors. Either the potential of the D.C. power source thus provided is unsuitable for the intended application because it is of a too small or too large a magnitude, or the potential of the source is not sufficiently constant for the intended use. In either case, a device with a coil having a ferromagnetic core is utilized to eliminate this difficulty. In the first instance, the device is in the form of a transformer having a pair of coils disposed about a ferromagnetic core, and in the second instance the device is called a choke and has a single winding disposed about a ferromagnetic core.

It is thus clear that a source of D.C. potential which utilizes power from an alternating current transmission line requires at least two elements in most cases, a rectifier and a transformer, and for precision work such a source requires a third element in the form of a choke. It is one of the objects of the present invention to eliminate the need for separate rectifying devices and devices utilizing iron core coils.

It is the further object of the invention to provide a source of D.C. power of smaller bulk and weight than the D.C. sources presently available, and to reduce manufacturing costs by combining fabrication of transformer and rectifier into one process.

Magnetic amplifiers have come into use which utilize a transformer with a pair of coils disposed about a saturable iron alloy core. The load is connected in a series circuit with one of the coils of the transformer and an A.C. source of power, and a D.C. current flows through the second coil of the transformer. By varying the magnitude of the D.C. current flowing through the second coil, the inductance of the first coil is varied, and since the D.C. power supplied to the second coil is less than the power to the load, the device may serve as a power amplifier. For many applications, however, it is more convenient and cheaper to supply alternating current directly to the second winding, and it is therefore a further object of the present invention to provide a saturable reactor or magnetic amplifier which may be controlled by an alternating current.

The inventor achieves the objects of this invention by providing a single relatively compact and lightweight unit which has a ferromagnetic core with a plurality of semiconducting rectifier cells assembled within the core, and an electrically conducting coil disposed about the core. This unit may be constructed as a rectifying choke, the alternating current received from the transmission line first being made to flow through the rectifier section of the unit and then through the coil of the unit for smoothing. It may also be constructed as a transformer where the unit is provided with a pair of coupled windings and the primary winding is connected to the transmission line, the secondary winding being connected to the intended load through a half wave or full wave rectifier section within the core of the unit.

A more thorough understanding of the invention and its significance may be had by a further reading of the present disclosure, particularly when viewed in the light of the drawings, in which.

Figure 1:
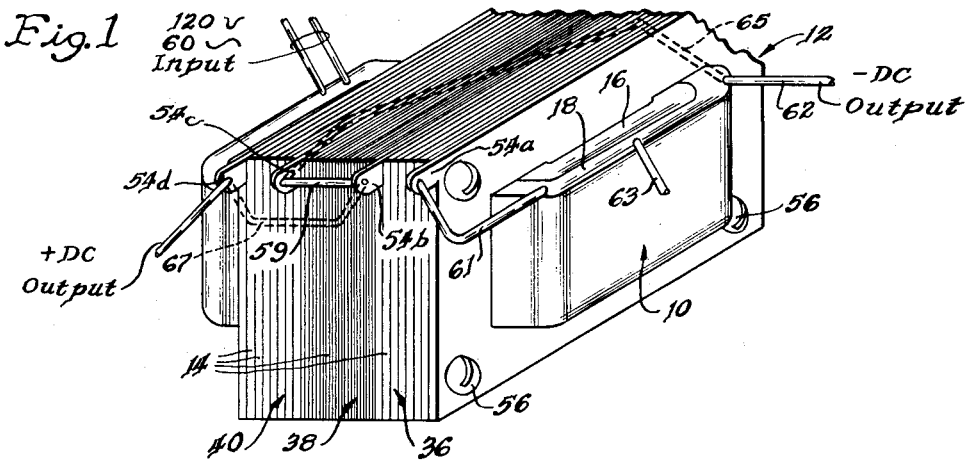
Figure 1 is an isometric view of a device constructed according to the teachings of the present invention.

Referring to the figures, the rectifying device has mutually coupled coils, designated 10, provided with a core 12 constructed of a plurality of laminations 14. The coils 10 consist of a primary winding 16 wound within a secondary winding 18, and the windings 16 and 18 are insulated from each other and from the core 12 of the device.

Figure 3:
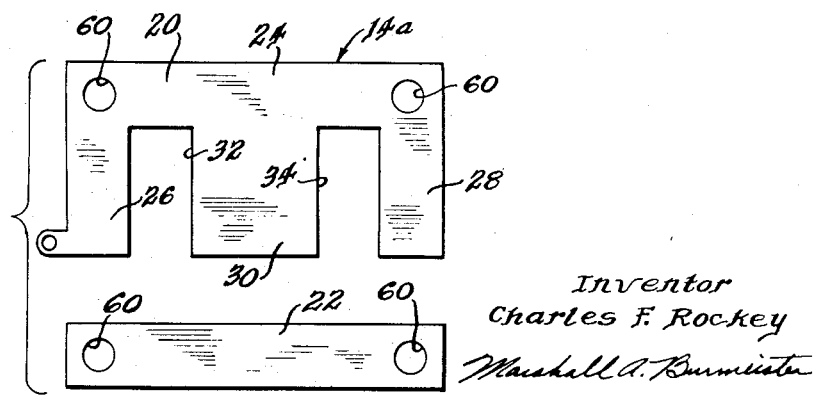
Figure 3 is a plan view of one of the laminations used in the device illustrated in Figures 1 and 2.

The core 12 is constructed of two types of plates 20 and 22 which form the laminations 14 and are constructed of ferromagnetic material, such as iron or iron alloy. The plates 20 are essentially E-shaped having a straight back portion 24, outwardly extending legs 26 and 28 from the ends of the back portion 24, and an outwardly extending central portion 30 disposed centrally between the legs 26 and 28, the central portion 30 being wider than the legs 26 and 28, as illustrated in Figure 3. The other type of plate 22 used to form the laminations 14 is in the form of a bar which is rectangular in shape and conforms to the dimensions of the back portion 24 of the plate 20. Each of the laminations 14 is formed by one of the bar shaped plates 22 and one of the E-shaped plates 20 being disposed in the same plane, and the plate 22 being adjacent to the legs 26 and 28 and the central portion 30 of one of the E-shaped plates 20, thus providing one lamination 14 with a pair of spaced apertures 32 and 34, and the coils 10 are wound about the central portion 30 of the plate 20 and extend through the apertures 32 and 34. The laminations are stacked so that the back portion 24 of each E-shaped plate 20 abuts the adjacent bar shaped plates 22, so that the stack of laminations possesses structural strength, and low magnetic reluctance.

The construction of the rectifier illustrated in the figures has a core 12 with three contiguous sections 36, 38, and 40. The three sections are disposed in abutting relationship with the section 38 between the sections 36 and 40, and section 38 is separated from each of the other sections 36 and 40 by a layer of electrical insulating material 42 and 44. In the particular construction described throughout this disclosure, the insulating material is phenol fiber, although other suitable electrical insulators may be used. The core 12 in the region 38 is of conventional construction, that is, each of the laminations 14 is electrically insulated from adjacent laminations by a thin coating 45 of electrically insulating material, spar varnish in the particular construction. As a result, eddy currents are prevented from flowing from one lamination 14 to the adjacent lamination in portion 38, and the efficiency of this portion 38 is improved.

Figure 4:
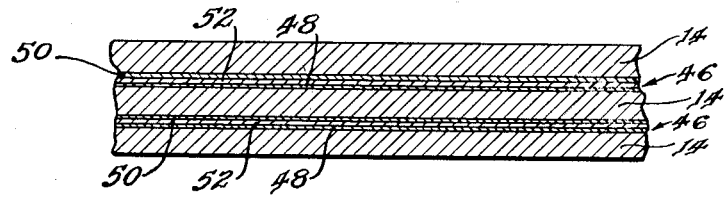
Figure 4 is a sectional view taken along line 4—4 of Figure 2.

The two portions 36 and 40 of the core 12 are rectifying portions, that is, these portions of the core 12 of the device perform a double function in that they serve to conduct the magnetic flux through the coils 10 and also to rectify the alternating current output of the secondary winding 18. Each lamination 14 of the two rectifying portions 36 and 40 of the device is separated from adjacent laminations by a semi-conducting barrier which will pass electrical current essentially in only one direction, and these semi-conducting barriers are oriented in the same directions to conduct an electrical current in only one direction through each of the rectifying portions 36 and 40 of the core 12. These semi-conducting barriers are shown clearly in Figure 4 and designated by the reference numeral 46.

As stated above, each of the laminations 14 is constructed of iron, or iron alloy, which is electrically conducting. One of each pair of adjacent laminations 14 is provided with a coating 48 of a fusible alloy, namely an electrically conducting alloy which melts at a temperature less than 150° C. This fusible alloy in the construction of the rectifying device described throughout this disclosure consists of a conventional lead-tin alloy, although other conventional fusible electrically conducting alloys can be used. The adjacent iron lamination 14 is also coated, but with a coating of nickel 50. Between the coatings 48 and 50 is a layer 52 consisting of properly oriented chemically pure selenium crystals. The order of the semi-conducting barriers 46 remains the same throughout each portion 36 and 40 of the device, so that each of the internal laminations 14 is provided with a coating 48 of fusible alloy on one surface and a coating 50 of nickel on the opposite surface. The end laminations designated 14a for both rectifier portions 36 and 40 are provided with lugs 54, and are only coated on the side confronting the adjacent lamination 14. The material with which the end laminations 14a are coated is either the fusible alloy or the pure nickel, this coating being of a different material from the adjacent lamination coating.

Figure 2:
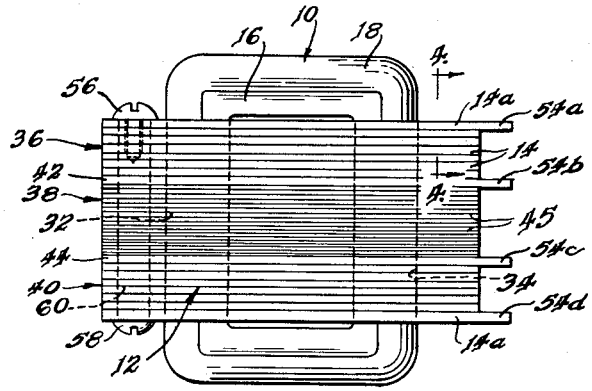
Figure 2 is an elevational view of the device illustrated in Figure 1.

As indicated in Figures 1 and 2, the core 12 of the rectifying device is held together by four bolts 56, one being disposed at each of the four corners of the core 12. Each pair of bolts 56 is threaded into a cylindrical insulator 58 which is slideably disposed within an aperture 60 which extends through the core 12. In this manner, the end laminations 14a of the core 12 are electrically insulated from each other and from all other laminations 14 of the core 12.

One end 61 of the secondary winding 18 of the coil 10 is electrically connected to the lug 54a at one end of the core portion 36, and the lug 54b at the opposite end of the rectifying portion 36 is connected by wire 59 to the adjacent lug 54c at the end of rectifier section 40. In this manner, the two rectifier sections 36 and 40 are connected in series and the inverse output voltage of the transformer is divided evenly across the two rectifying sections 36 and 40. The direct current output of the transformer then is obtained from the lug 54d at the other end of rectifier section 40 and the free terminal, designated 62, of the secondary winding 18.

When using a selenium crystal semi-conducting barrier, it is generally necessary under good design to limit the maximum potential applied to any individual barrier to approximately 22 volts. Because of this limitation, many semi-conducting barriers 46 must be used to rectify the voltage developed in the secondary winding 18 of the coil 10. This is the reason that the two rectifying portions 36 and 40 are serially connected. It is also apparent that the secondary coil 18 may be provided with a center tap 63 and one of the rectifying portions 36 and 40 connected to each end 61 and 62 of the coil 18 to produce a full wave rectifier if the output voltage of the secondary 18 of the coils 10 is sufficiently low, as is indicated by wire 65 shown in dotted lines, wire 59 being omitted and wire 67 connecting terminals 54b and 54d; the full wave rectified voltage appearing between center tap 63 and the interconnected terminals 54b and 54d. In addition, the rectifying portions could be separated into four insulated sections and, for a suitable voltage, connected as a bridge rectifier.

In a particular construction of the embodiment of the invention illustrated, the rectifier unit is designed to deliver an output voltage of approximately 250 volts D.C. from an input voltage of approximately 120 volts 60-cycle A.C. The primary coil 16 has eleven hundred turns of number 26 enamel wire wound about the center leg 30 of the E-shaped lamination plate 20. The center leg 30 of each E-shaped plate 20 extends outwardly from the back 24 of the plate 20 approximately 1 inch and is 1 inch wide, the back 24 and legs 26 and 28 being only ½ inch wide. Each of the laminations 14 in the central portion 38 of the core 12 is approximately 0.005 inch thick with layers of electrically insulating varnish therebetween, there being one hundred such laminations in the central portion 38. Each of the rectifying portions 36 and 40 contains eight laminations 14 approximately 1/10 inch thick separated by the semi-conducting barriers 46. The plastic insulating sheets 44 are approximately 0.01 inch thick and are disposed between the central portion 38 and each of the rectifying portions 36 and 40. In the semi-conducting barriers 46, the layer 48 of fusible alloy has a thickness of approximately 0.001 inch, the coating of nickel 50 a thickness of approximately 0.001 inch, and the layer of selenium crystals is precipitated thereupon as in current selenium rectifier practice. As a result of this construction, the apertures 32 and 34 extend through approximately 1½ inches of core 12. The secondary winding 18 consists of twenty-seven hundred turns of number 30 enamelled wire wound about the primary winding 16, the primary winding 16 occupying approximately the first ¼ inch of aperture space and the secondary windings the other ¼ inch of space in the apertures 32 and 34. As thus constructed, the rectifying device will deliver approximately 300 volts at 40 milliamperes maximum D.C. to a load with 120 volt 60-cycle input to the primary winding 16, the rectifying portions 36 and 40 being serially connected.

It is of course clear that the semi-conducting barrier 46 need not be constructed with selenium crystals. The semi-conducting barrier can also be constructed with a copper oxide and copper barrier; however, in such a construction the voltage applied across a single semi-conducting barrier 46 must not exceed 8 volts. When utilizing copper and copper oxide, the layer 48 consists of nickel, the layer 52 of copper oxide, and the layer 50 of copper. In a typical construction, the layer 50 consists of approximately 0.005 inch of pure copper plating, the layer 52 consists of approximately 0.003 inch of copper oxide, and the coating 48 consists of approximately 0.005 inch of nickel plating. Using two portions 36 and 40 constructed in this manner, the device may be constructed with essentially identical dimensions to those given above for the selenium crystal rectifier sections, but the alternating current applied to the primary winding 16 must be limited to approximately 48 volts in order to avoid decomposition or destruction of the copper oxide semi-conducting barriers 46.

As stated above, any semi-conducting barrier 46 may be used in the practice of the invention. In addition to those set forth above, a semi-conducting barrier utilizing copper and thallium sulfides, or other silicon or germanium semi-conductor devices may be utilized in the same manner.

Figure 5:
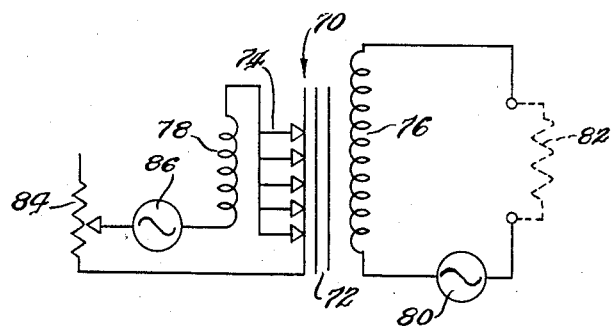
Figure 5 is a schematic diagram of a saturable reactor constructed according to the teachings of the present invention.

Figure 5 illustrates the present invention embodied in a magnetic amplifier or saturable reactor. A rectifying device 70 is constructed with a saturable iron alloy core 72 having a rectifier portion indicated schematically at 74. Portion 74 is constructed identical to one of the portions 36 and 40 of the device illustrated above; and the device 70 may in fact be constructed similarly to the device of Figure 1. The device 70 has a pair of windings 76 and 78, winding 76 being connected in a series circuit with an A.C. source 80 and a load 82, indicated by dashed lines. Winding 78 is connected in a series circuit with the rectifier section 74 of the device 70, a variable resistor 84 and a second A.C. source 86.

This construction permits an A.C. signal to control the degree of saturation of the core 72 of the device 70, and hence the inductance of the winding 76. It is also clear that the A.C. source 86 which controls the degree of saturation of the core can be directly derived from the A.C. source 80 which drives the load 82.

Figure 6:
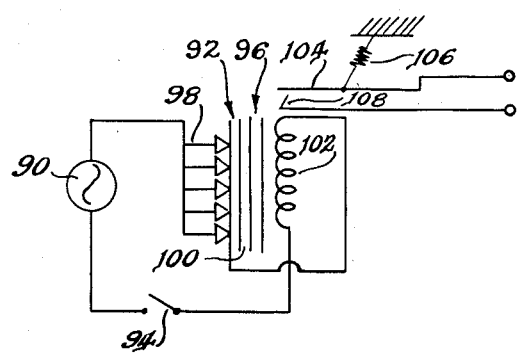
Figure 6 is a schematic diagram of another embodiment of the invention in the form of an alternating current relay.

Figure 6 illustrates the present invention utilized in a relay. An alternating current source 90 is connected to the device 92 through a switch which is closed to actuate the relay. The device 92 has a core 96 with a semi-conducting barrier 98 between a pair of laminations 100. The A.C. source 90 is directly connected to one of these laminations, and the confronting lamination is connected to one end of a coil 102 of the device 92. The other end of the coil 102 is connected to the switch 94, thereby forming a series circuit including the A.C. source 90, semi-conducting barrier 98, coil 102 and switch 94.

An electrically conducting contact arm 104 constructed of ferromagnetic material is pivotally mounted adjacent to the coil 102, and a spring 106 biases the arm 104 away from the coil 102. An electrical contact 108 is disposed between the arm 104 and the coil 102.

Closing the switch 94 causes a current to be rectified in the core 96 before it flows through the coil 102. This D.C. current flowing through the coil 102 attracts the arm 104, causing it to come into contact with contact 108.

This relay has the advantage of operating from an A.C. source without the disadvantages of A.C. relays. It will not be subject to the chatter of A.C. relays and will be capable of operation with a smaller spring tension on the arm 104 than is possible with A.C. relays, thus providing greater sensitivity. In addition, it is compact and less expensive to construct than an A.C. relay and a separate rectifier.

The rectifying device described above could be termed a rectifying transformer, but it is clear that the present invention is not limited to such a structure. For example, one of the windings 10 of the transformer may be omitted, and the remaining winding will then be a portion of a rectifying choke. In some applications, it may be more convenient to combine the rectifying features of the device with those of a smoothing choke. In addition, the laminated core of an electrodynamic loudspeaker or microphone may also be provided with semi-conducting barriers according to the teachings of the present invention. When so provided with semi-conducting barriers, the core of the speaker may be used to rectify power derived from a power line to provide the direct current necessary to directly drive the electromagnet of the speaker or microphone.

It is thus clear, that the invention has many utilities and modifications beyond that specifically disclosed herein, and it is therefore intended that the scope of the present invention be not limited by the foregoing disclosure, but only by the appended claims.

I claim:

1. An alternating current rectifying device comprising a ferromagnetic core having three groups of laminations, the central group of laminations being electrically insulated from each other, semi-conducting barriers disposed between each pair of laminations in the two other groups, said barriers having higher direct current resistances in one direction therethrough than in the other and being oriented to pass an electrical current in one direction through each group, and a coil disposed about the core.

2. An alternating current rectifying device comprising a ferromagnetic core having three groups of laminations, the central group of laminations being electrically insulated from each other, semi-conducting barriers disposed between each pair of laminations in the two other groups, said barriers having higher direct current resistances in one direction therethrough than in the other and being oriented to pass an electrical current in one direction through each group and a pair of mutually coupled coils electrically insulated from each other and from the core wound about the core, one of said coils having one end connected to one of the laminations in one of the outer portions of the core.

3. An alternating current rectifying device comprising a ferromagnetic core having three groups of laminations, the central group of laminations being electrically insulated from each other, semi-conducting barriers disposed between each pair of laminations in the two other groups, said barriers having higher direct current resistances in one direction therethrough than in the other and being oriented to pass an electrical current in one direction through each group, a pair of mutually coupled coils electrically insulated from each other and from the core wound about the core, one of said coils being provided with a center tap and having one of its ends electrically connected to the end lamination of each of the outer portions of the core, and means interconnecting the other end laminations of each portion of the core, whereby an alternating potential may be applied to the other coil of the device and a direct current potential appears across the interconnected laminations of the core and the center tap of the coil.

4. An alternating current rectifying device comprising the elements of claim 3 wherein each of the laminations consists of an E-shaped plate and a bar shaped plate disposed in the same plane in abutting relationship, thereby forming a pair of apertures in the laminations, the coils being disposed within the apertures.

5. A variable reactor comprising a ferromagnetic core having a plurality of laminations electrically insulated from each other, a semi-conducting barrier disposed between adjacent laminations of the core, said semi-conducting barrier having a higher direct current resistance in one direction therethrough than in the other, a pair of mutually coupled coils electrically insulated from the core and each other disposed about the core, one of said coils having one end electrically connected to a lamination adjacent to the barrier, and means for controlling the saturation of the core including an alternating current source electrically connected between the other end of said coil and the other lamination confronting the semi-conducting barrier and means to vary the magnitude of the current flowing through said coil, whereby a second alternating current source may be electrically connected in series with the other coil of the device and a load, and the reactance of the other coil will be determined by the potential of the first alternating current source.

6. A variable reactor comprising the elements of claim 5 wherein the core has three groups of laminations, the central group of laminations being electrically insulated from each other and the semi-conducting barriers being disposed between each pair of laminations in the other two groups, said two groups of laminations being electrically interconnected.

7. A variable reactor comprising a ferromagnetic core having a plurality of laminations electrically insulated from each other, a semi-conducting barrier disposed between adjacent laminations of the core, said semi-conducting barrier having a higher direct current resistance in one direction therethrough than in the other, a pair of mutually coupled coils electrically insulated from the core and each other disposed about the core, the first of said coils having one end electrically connected to a lamination adjacent to the barrier, means connected in series with the first coil and the semi-conducting barrier for varying the magnitude of electric current flowing therethrough, whereby a first alternating current source may be connected in series with the first coil and semi-conducting barrier and a second alternating current source may be connected in series with the second coil, and the reactance of the second coil will be determined by the magnitude of the current flowing through the first coil.

8. An alternating current rectifying device comprising, in combination, a ferromagnetic core having a central group of laminations electrically insulated from each other and an adjacent group of laminations, semi-conducting barriers disposed between each pair of laminations in the group adjacent to the central group, said barriers having higher direct current resistances in one direction therethrough than in the other and being oriented to pass an electrical current in one direction through the group, and a coil disposed about the core.

9. A variable reactor comprising the elements of claim 5 wherein the means to vary the magnitude of the current flowing through the coil of the saturation controlling means comprises a variable resistor.

10. A variable reactor comprising the elements of claim 5 wherein the semi-conducting barrier includes a layer of selenium crystals.

11. A variable reactor comprising the elements of claim 5 wherein the semi-conducting barrier comprises silicon.

12. A variable reactor comprising the elements of claim 5 wherein the semi-conducting barrier comprises germanium.

13. A variable reactor comprising the elements of claim 5 wherein the semi-conducting barrier comprises thallium sulfides.

References Cited in the file of this patent
UNITED STATES PATENTS

| | | |
|---|---|---|
| 1,792,512 | Siegmund | Feb. 17, 1931 |
| 2,180,159 | Michaelis | Nov. 14, 1939 |
| 2,339,613 | Becker et al. | Jan. 18, 1944 |
| 2,399,773 | Waintrob | May 7, 1946 |
| 2,546,736 | Fry et al. | Mar. 27, 1951 |